United States Patent Office
3,558,573
Patented Jan. 26, 1971

3,558,573

NOVEL POLYESTERS FROM HYDRAZINES AND LACTONES AND A PROCESS FOR THEIR PRODUCTION

Wolf-Dieter Wirth, Cologne-Stammheim, and Erwin Müller, Leverkusen, Germany, assignors to Farbenfabriken Bayer Aktiengesellschaft, Leverkusen, Germany, a corporation of Germany No Drawing. Filed Apr. 21, 1969, Ser. No. 818,058
Claims priority, application Germany, Apr. 30, 1968, P 17 70 300.3
Int. Cl. C08g *17/017*
U.S. Cl. 260—78.3 3 Claims

ABSTRACT OF THE DISCLOSURE

Hydroxyl polyesters having a molecular weight of from about 300 to about 20,000 are prepared by polymerizing a lactone having from 7 to 9 members in the ring in the presence of a hydrazine. The polyesters are suitable for plasticizers and stabilizers for polyvinyl chloride or as a reactant with polyisocyanate to prepare polyurethanes.

NOVEL POLYESTERS AND A PROCESS FOR THEIR PRODUCTION

This invention relates to hydroxyl polyesters and more particularly to polyesters prepared from lactones and hydrazines.

The polymerization of lactones in the presence of organic compounds which have several active hydrogen atoms, e.g. polyhydric alcohols or amines, is known. Thus, for example, the polymerization of γ-butyrolactone or δ-valerolactone in the presence of a polyhydric alcohol in the presence of sulphuric acid as catalyst at temperatures between 190 and 200° C. to produce polyesters which have terminal carboxyl groups is known. It is also known to polymerize δ-valerolactone, a lactone having five carbon atoms in the lactone ring, without the addition of a catalyst, in the presence of a polyhydric alcohol over a long period (about 10 hours) at temperatures above 150° C. Lactones which have 6 carbon atoms in the lactone ring are very difficult to polymerize without catalysts in the presence of organic compounds which have several active hydrogen atoms, such as polyhydric alcohols or amines. However, these lactones can be polymerized in shorter times if catalysts are added, see DAS 1,206,586; 1,213,995 and 1,209,245.

It is an object of this invention to provide improved polyesters. It is another object of this invention to provide an improved process for preparing polyesters. It is still another object to conduct the polymerization of lactones in less time even without catalysts.

The foregoing objects and others which will become apparent from the following description are accomplished in accordance with this invention, generally speaking, by providing hydroxyl-containing polyesters having a molecular weight of from about 300 to about 20,000 and general formula

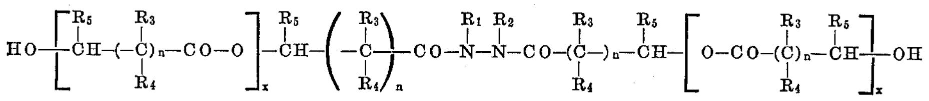

wherein $R_1$ and $R_2$ may be the same or different, and represent hydrogen atoms, alkyl radicals having one to four carbon atoms, hydroxyalkyl radicals having one to four carbon atoms, allyl radicals, cyanoethyl radicals, aryl radicals having six to twelve carbon atoms or heterocyclic radicals;

$R_3$ and $R_4$ may be the same or different, and represent alkyl radicals having one to four carbon atoms, cycloalkyl radicals having six to twelve carbon atoms, alkoxy radicals having one to four carbon atoms, aryl radicals having six to twelve carbon atoms provided that at least $n+2$ of the radicals are hydrogen atoms;

$R_5$ represents a hydrogen atom or an alkyl radical having one to four carbon atoms;

$n$ is an integer from 4 to 6; and $x$ is 0 or is a positive integer.

The invention also relates to a process for the preparation of these polyesters, in which (1) lactones of the general formula

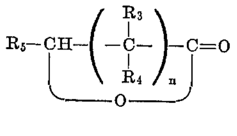

wherein $R_3$ and $R_4$ may be the same or different, and represent $C_1$–$C_4$ alkyl radicals, $C_6$–$C_{12}$ cycloalkyl radicals, $C_1$–$C_4$ alkoxy radicals, or $C_6$–$C_{12}$ aryl radicals, and in which at least $n+2$ of the radicals denote hydrogen atoms;

$R_5$ represents a hydrogen atom or a $C_1$–$C_4$ alkyl radical; and $n$ denotes an integer from 4 to 6, are heated at temperatures of from about 50 to about 300° C., in the presence of (2) hydrazines of the general formula $$R_1—HN—NH—R_2$$

wherein $R_1$ and $R_2$ may be the same or different, and represent hydrogen atoms, $C_1$ to $C_4$ alkyl radicals, $C_1$ to $C_4$ hydroxyalkyl radicals, allyl radicals, cyanoethyl radicals, substituted or unsubstituted $C_6$ to $C_{12}$ aryl radicals or heterocyclic radicals.

Any suitable lactone having the formula represented above may be used in the process according to the invention, such as, for example, ε-caprolactone and substituted ε-caprolactones, for example, the various monoalkyl($C_1$–$C_4$)-ε-caprolactones, e.g. monomethyl-, monoethyl-, monopropyl-, monoisopropyl- and monobutyl - ε - caprolactone; dialkyl($C_1$–$C_4$)-ε-caprolactones in which the two alkyl groups are attached to the same or different carbon atoms but in which both are not attached to the ε-carbon atom, e.g. dimethyl-, diethyl- and dibutyl-ε-caprolactone, trialkyl($C_1$–$C_4$) - ε - caprolactones in which three carbon atoms on the lactone ring are substituted, provided that the ε-carbon atom is not disubstituted; e.g. trimethyl-, triethyl- and tributyl - ε - caprolactone; alkoxy - ($C_1$–$C_4$)-ε-caprolactones such as methoxy-, ethoxy- and butoxy-ε-caprolactone and cycloalkyl- and aryl - ε - caprolactones which have $C_6$–$C_{12}$ - cycloalkyl or $C_6$–$C_{12}$ - aryl radicals such as cyclohexyl- and phenyl - caprolactones. ε-Oenantholactone and η-caprylic lactone are given as examples of lactones which have more than 6 carbon atoms in the ring. ε-caprolactone and substituted ε-caprolactones are particularly preferred as starting materials.

In the process according to the invention, hydrazines of the general formula

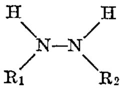

wherein $R_1$ and $R_2$, which may be the same or different, represent hydrogen atoms, $C_1$–$C_4$ alkyl radicals, $C_1$–$C_4$ hydroxyalkyl radicals, allyl radicals, cyanoethyl radicals, substituted or unsubstituted $C_6$–$C_{12}$ aryl radicals or heterocyclic radicals, are used as initiators for opening the lactone ring.

Any suitable hydrazine having the formula represented may be used, such as, for example, N,N-dimethylhydrazine isopropylhydrazine, N,N' - dipropylhydrazine, hydrazine, methylhydrazine, propylhydrazine, N,N'-diethylhydrazine, butylhydrazine, N,N'-dibutylhydrazine, phenylhydrazine, naphthylhydrazine, (2-cyanoethyl)hydrazine, N-methyl-N'(2 - hydroxyethoxycarbonyl)hydrazine, 2 - hydrazinoethanol-(1), N - hydroxyethyl-hydrazine, allylhydrazine, N,N' - bis(2 - hydroxyethyl)hydrazine N - hydroxybutylhydrazine and 3 - hydrazinotetrahydrothiophene - 1,1-dioxide.

Hydrazine, methylhydrazine, phenylhydrazine and 2-hydrazinoethanol-(1) are preferred.

The process of the invention is carried out at temperatures between about 50 and about 300° C., preferably between about 130 and about 220° C. The progress of the polymerization is monitored by determining the OH number or the refractive index. The reaction may be regarded as complete as soon as the refractive index remains constant. To produce a pale colored polyester, the reaction should preferably be carried out with the exclusion of oxygen. This is achieved, for example, by working at slightly reduced pressure or by passing an inert gas, such as nitrogen, over the reaction mixture. After the polymerization is finished, any unreacted monomers still present can be removed under reduced pressure, e.g. of 1 to 5 mm. Hg., by heating, e.g. at about 120 to about 220° C.

The polyesters produced according to the invention usually have a molecular weight between about 300 and about 20,000, preferably between about 500 and about 12,000, hydroxyl numbers between 50 and 350 and acid numbers of up to 7, but preferably below 2.

Since theoretically one molecule of hydrazine used as an initiator is sufficient to polymerize an unlimited number of lactone molecules, the quantity of initiator used may be very small in relation to the quantity of lactone. However, the molecular weight of the polyester can be determined by the ratio of initiator to quantity of lactone. As will be seen from the formula of the polyester produced according to the invention, two molecules of latcone first add on to one molecule of the hydrazine or hydrazine derivative, and higher molecular weight polyesters are then produced by further reaction with more molecules of the lactone.

The polyesters according to the invention can be used, for example, as plasticizers and stabilizers for polyvinyl chloride or as a reactant with organic isocyanates to prepare polyurethanes.

The invention will be further illustrated by the following examples in which parts are by weight unless otherwise specified.

GENERAL PROCEDURE

The lactone is mixed with stirring with the initiator at room temperature and is then heated to the given reaction temperature while maintaining a nitrogen atmosphere.

Example 1

Lactone—1,950 parts ε-caprolactone
Initiator—32 parts hydrazine (98 percent)
Reaction time—3 hours
Reaction temperature—220° C.
Properties of the polyester:
  Hydroxyl number—66
  Acid number—7.0

Example 2

Lactone—410 parts ε-caprolactone
Initiator—9.2 parts methylhydrazine
Reaction time—6 hours
Reaction temperature—220° C.
Properties of the polyester:
  Hydroxyl number—54
  Acid number—1.8
  Softening point—44–46° C.

Example 3

Lactone—378 parts ε-caprolactone
Initiator—21.6 parts phenylhydrazine
Reaction time—15 hours
Reaction temperature—220° C.
Properties of the polyester:
  Hydroxyl number—67
  Acid number—1.5
Very viscous, partly solid mass.

Example 4

Lactone—382 parts ε-caprolactone
Initiator—17.2 parts (2-cyanoethyl)hydrazine
Reaction time—12 hours
Reaction temperature—220° C.
Properties of the polyester:
  Hydroxyl number—54
  Acid number—7.0
  Softening point—48–49° C.

Example 5

Lactone—388 parts ε-caprolactone
Initiator—15.2 parts 2-hydrazinoethanol-(1)
Reaction time—5 hours
Reaction temperature—220° C.
Properties of the polyester:
  Hydroxyl number—87
  Acid number—2.0
Very viscous, partly solid mass.

Example 6

Lactone—373 parts ε-caprolactone
Initiator—26.8 parts N - methyl-N-(2-hydroxy-ethoxycarbonyl)-hydrazine
Reaction time—9 hours
Reaction temperature—220° C.
Properties of the polyester:
  Hydroxyl number—105
  Acid number—0.5
Very viscous, partly solid mass.

Example 7

Lactone—370 parts ε-caprolactone
Initiator—30 parts 3-hydrazino-tetrahydrothiophene-1,1-dioxide
Reaction time—13 hours
Reaction temperature 220° C.
Properties of the polyester:
  Hydroxyl number—47.0
  Acid number—4.6
  Softening point—45–47° C.

Although the invention has been described in considerable detail in the foregoing it is to be understood that such detail is merely for the purpose of illustration and that many variations can be made by those skilled in the art without departing from the spirit and scope of the invention.

What is claimed is:

1. Hydroxyl-containing polyesters having a molecular weight of about 300 to about 20,000 and of the general formula

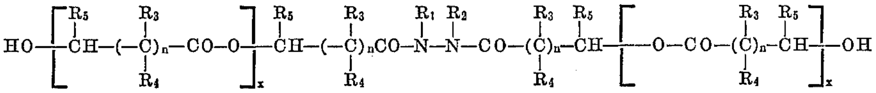

wherein $R_1$ and $R_2$ are the same or different, and selected from hydrogen atoms, alkyl radicals having 1 to 4 carbon atoms, hydroxyalkyl radicals having 1 to 4 carbon atoms, allyl radicals, cyanoethyl radicals, aryl radicals having 6 to 12 carbon atoms or tetrahydro-1,1-dioxo-thiophenyl radicals $R_3$ and $R_4$ are the same or different and selected from alkyl radicals having 1 to 4 carbon atoms, cycloalkyl radicals having 6 to 12 carbon atoms, alkoxy radicals having 1 to 4 carbon atoms or aryl radicals having 6 to 12 carbon atoms and at least $n+2$ of these radicals are hydrogen atoms, $R_5$ represents a hydrogen atom or an alkyl radical having 1 to 4 carbon atoms, $n$ is an integer of 4 to 6, and $x$ is 0 or is an integer.

2. A process for the preparation of polyesters which comprises heating to a temperature of from about 50° C. to about 300° C. a lactone of the general formula

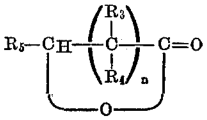

wherein $R_3$, $R_4$, $R_5$ and $n$ have the same significance as set forth in claim 1 and a hydrazine of the general formula $$R_1—HN—NH—R_2$$

wherein $R_1$ and $R_2$ have the same significance as set forth in claim 1.

3. The process of claim 2 wherein the lactone is an ε-caprolactone.

References Cited

UNITED STATES PATENTS

| | | | |
|---|---|---|---|
| 3,169,945 | 2/1965 | Hostettler et al. ----- | 260—78.3 |
| 3,475,385 | 10/1969 | Goodman et al. ------ | 260—78 |

OTHER REFERENCES

Chem. Abstracts 31, $658^7$ (1937).

WILLIAM H. SHORT, Primary Examiner

E. A. NIELSEN, Assistant Examiner

U.S. Cl. X.R.

260—32.2, 78.3, 465.4, 484, 873